United States Patent [19]

Gassert

[11] 4,084,843
[45] Apr. 18, 1978

[54] QUICK-ACTING HOSE OR PIPE COUPLING

[76] Inventor: Willy Gassert, Hauptgasse 59, Solothurn, Switzerland, CH-4500

[21] Appl. No.: 682,034

[22] Filed: Apr. 30, 1976

[30] Foreign Application Priority Data

May 2, 1975 Switzerland ............................ 5711/75
Aug. 1, 1975 Switzerland .......................... 10165/75

[51] Int. Cl.² ................................................ F16L 33/16
[52] U.S. Cl. ...................................... 285/105; 285/306; 285/340
[58] Field of Search .............. 285/104, 105, 340, 102, 285/306, DIG. 3

[56] References Cited

U.S. PATENT DOCUMENTS

| | | | |
|---|---|---|---|
| 1,998,176 | 4/1935 | Thompson | 285/102 |
| 2,491,004 | 12/1949 | Graham | 285/105 |
| 3,365,219 | 1/1968 | Nicolous | 285/340 |
| 3,409,314 | 11/1968 | Roe | 285/105 X |
| 3,645,567 | 2/1972 | Reinker | 285/340 |
| 3,837,687 | 9/1974 | Leonard | 285/340 |
| 3,877,733 | 4/1975 | Straub | 285/105 |
| 3,879,065 | 4/1975 | Kobayashi | 285/340 X |

FOREIGN PATENT DOCUMENTS

| | | | |
|---|---|---|---|
| 673,408 | 11/1963 | Canada | 285/340 |
| 849,671 | 4/1962 | United Kingdom | 285/340 |

*Primary Examiner*—Dave W. Arola
*Attorney, Agent, or Firm*—Karl F. Ross

[57] ABSTRACT

A coupling for connecting a supply conduit to a rigid or flexible extension tube, designed to carry a fluid under pressure, comprises a cylindrical housing having one end wall fastened to the conduit and another end wall formed with an opening for the insertion of an extremity of the tube. The inserted tube extremity is closely surrounded, within the housing, by one or more dished springs which can be deformed under axial pressure from an adjoining annular thrust member when the tube is filled with fluid; the pressure of the fluid may act upon the thrust member through an elastic ring, embracing the tube extremity which shifts relatively to the housing under such pressure, or directly through a gap behind that member which then operates as a piston forming a socket for the tube. The dished spring or springs are peripherally subdivided into coherent ring segments by radial slits facilitating the deformation of the spring which, by contracting under the applied axial pressure, grips the tube and prevents its extraction from the housing; this gripping action may be maintained, after reduction of the fluid pressure, by an indexing of the thrust member in its axially shifted position. Decoupling is possible by a reverse shifting of the tube to relax the dished spring or springs.

12 Claims, 9 Drawing Figures

QUICK-ACTING HOSE OR PIPE COUPLING

FIELD OF THE INVENTION

My present invention relates to a quick-acting coupling for a rigid or flexible tube, i.e. a pipe or a hose, which is to be connected to a source of liquid or gas under pressure, e.g. as an extension of a conduit carrying a hydraulic or pneumatic fluid for the drive or the control of some mechanism.

BACKGROUND OF THE INVENTION

Fluid couplings are known in which a female half or socket, connected to a source of pressure fluid, receives a male half or plug on the extension tube which, therefore, must be specially provided with such a fitting. Other conventional couplings dispense with the need for a male fitting by utilizing a clamp designed to grip an extremity of a hose or pipe to be supplied with fluid from the associated source. Such clamps are relatively complex and correspondingly expensive; moreover, they do not always have a firm grip on the tube, especially in the case of a rubber hose or the like.

OBJECT OF THE INVENTION

The object of my present invention, therefore, is to provide a simple yet dependable coupling of the quick-acting type for securely attaching a tube of given diameter, whether rigid or flexible, to a conduit leading to a source of fluid under pressure.

SUMMARY OF THE INVENTION

I realize this subject, in accordance with my present invention, by providing a housing which has a first end wall with an inlet for the pressure fluid and a second end wall with an opening for the insertion of a tube extremity, the inserted extremity passing through a central aperture of a dished annular spring of frustoconical shape facing the inlet with its convex side. An annular thrust member in the housing, coaxially juxtaposed with the spring on the inlet side, exerts axial pressure on the spring upon the admission of fluid from the source whereby the spring is deformed into gripping engagement with the inserted tube extremity. Such deformation is facilitated by radially slitting the spring, from its central aperture outwardly, to divide it into a plurality of coherent ring segments which in turn may be further subdivided by further slits extending radially inwardly from the outer periphery of the spring. Several such springs may be stacked within the housing, alternating with respective thrust members or displaceable jointly by a single thrust member.

The shifting of the thrust member upon the filling of the tube with fluid under pressure may be carried out directly, with the thrust member acting as a piston, or indirectly through the intermediary of the tube itself, provided the tube is closed at its remote end or is long enough to offer a substantial resistance to the fluid flow. Thus, the inlet of the housing may comprise a boss forming a socket in which the inserted tube extremity is slidable and from which that extremity is partially dislodged upon the admission of fluid to the inlet, this sliding motion being limited by frictional engagment of the tube extremity with a surrounding elastic ring positioned in the housing between the boss and the disk-shaped thrust member. The ring, entrained by the sliding tube, acts through the thrust member upon the dished spring to deform it in a tube-gripping member.

BRIEF DESCRIPTION OF THE DRAWING

The above and other features of my invention will now be described in detail with reference to the accompanying drawing in which.

Specific Description

Figure 1:
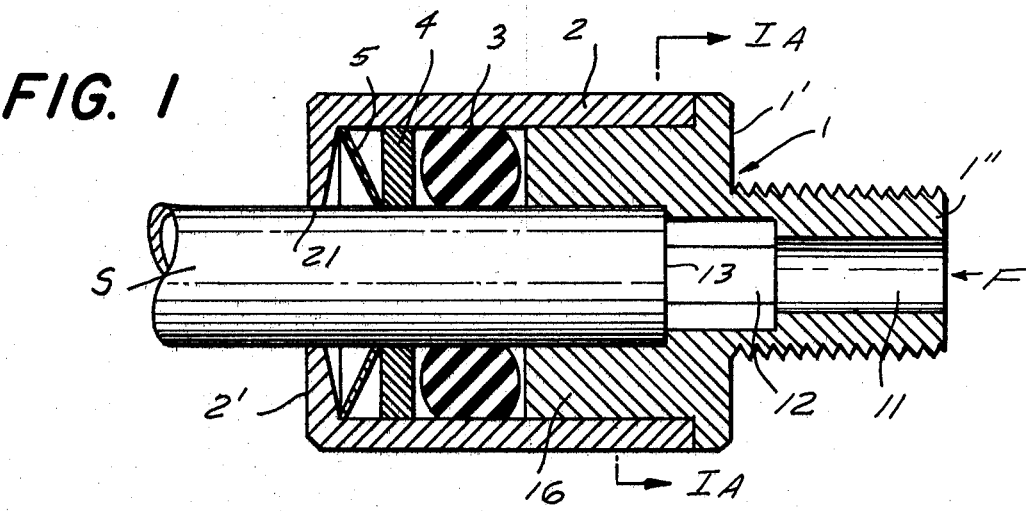
FIG. 1 is a longitudinal sectional view of an improved fluid coupling embodying the invention.
Figure 2:
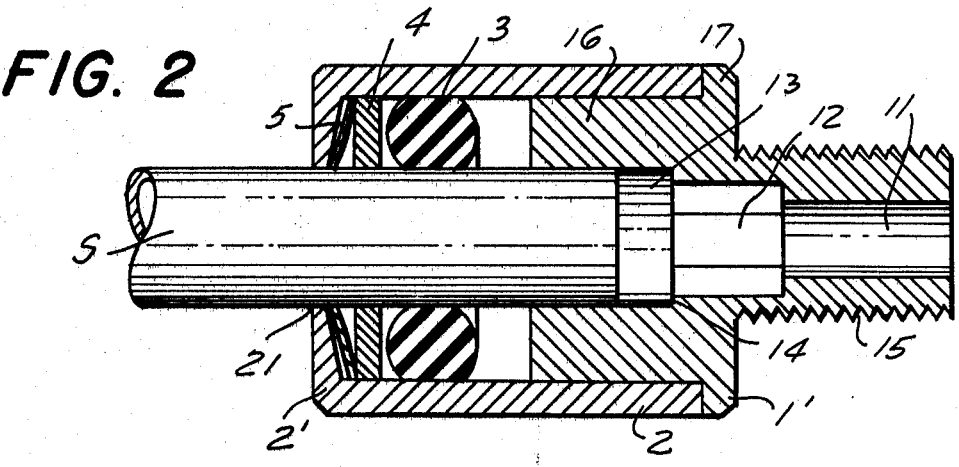
FIG. 2 is a view similar to FIG. 1, showing the device in an alternate position.
Figure 1A:
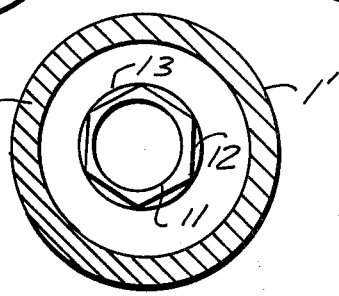
FIG. 1A is a cross-sectional view taken on the line IA — IA of FIG. 1.

Reference will first be made to FIGS. 1, 1A and 2 showing a housing 1 divided into two parts, i.e. a first part forming an end wall 1' with an inlet nipple 1" and a second part forming a cylindrical shell 2 terminating in another end wall 2'. Nipple 1" is provided with male threads 15 for attachment to a nonillustrated conduit leading to a pump or other source of high-pressure fluid as diagrammatically indicated by an arrow F; it will be apparent that housing 1 could also be integral with such a conduit replacing the nipple 1'. An inlet port 11, in the form of a cylindrical bore, opens into an intermediate passage 12 of larger cross-sectional area communicating with a socket 13 of still larger area formed in a boss 16 integral with wall 1'. The bottom of socket 13 is formed by a shoulder 14. End walls 1' and 2' are transverse to the axis of shell 2.

As best shown in FIG. 1A, the cross-section of passage 12 is a regular hexagon circumscribing the circular cross-section of bore 11 and inscribed in the circular cross-section of socket 13, this passage thus serving as a transition between the two bores 11 and 13 of different diameters.

End wall 2' has an opening 21, coaxial with socket 13 and of the same diameter, enabling the insertion of an extremity of a tube S to be fluidically coupled with nipple 1". Between the boss 16 and end wall 2' the housing 1 contains a toroidal elastomeric ring 3, a thrust member 4 in the shape of a flat annular disk, and a spring 5 of Belleville type with a frustoconical body turning its convex side toward the inlet 11 - 13. All three members 3 - 5 contact the shell 2 with their outer peripheries and closely surround the inserted tube S; in its natural state, i.e. in the absence of tube S, the inner diameter of O-ring 3 is slightly less than that of the tube so that this ring will firmly grip the tube extremity inserted into the housing.

Figure 5:
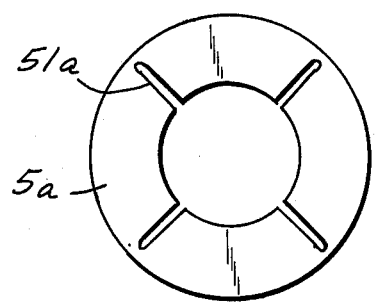
FIGS. 5 - 8 are face views of several dished springs usable in any of the devices of FIGS. 1 - 4.
Figure 6:
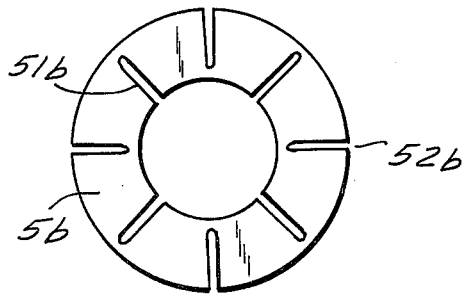
Figure 7:
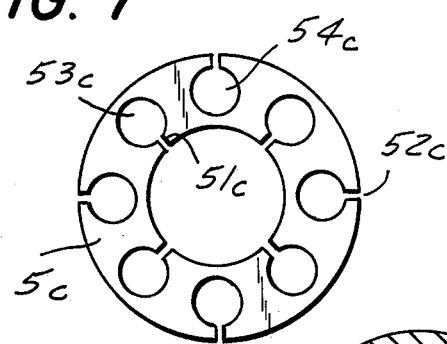
Figure 8:
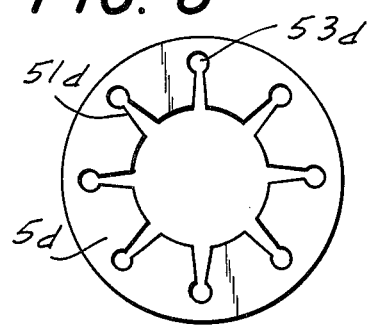

FIGS. 5 - 8 show several shapes suitable for the dished spring 5. Thus, FIG. 5 depicts a spring 5a with four radial slits 51a terminating short of its outer periphery to divide the disk body into four ring segments. In FIG. 6 a disk 5b has similar outwardly extending slits 51b alternating with inwardly extending slits 52b which subdivide each ring segment into a pair of identical halves. In FIG. 7 I have illustrated a disk 5c whose slits 51c and 52c terminate in circular cutouts 53c and 54c designed to increase the flexibility of the several ring segments. FIG. 8 depicts a spring 5d with eight outwardly extending slits 51d terminating in smaller circular cutouts 53d.

The segments of spring 5, converging toward end wall 1' and disk 4, do not prevent the insertion of the tube S into the socket 13; with the fluid flow F turned off upstream of nipple 1", e.g. by a nonillustrated valve, only ambient pressure prevails inside housing 1. When fluid under pressure begins to enter the tube S via bore 11 and passage 12, it axially displaces the tube S with entrainment of O-ring 3 which shifts the disk 4 to the left as viewed in FIG. 2, thereby deforming the spring 5 past its unstable flat shape so as to invert its curvature. The inverted spring comes to rest against the inner surface of end wall 2' which is frustoconically concave with a vertex angle larger than that of the unstressed spring shown in FIG. 1. Thus, the deformed spring remains stressed as it presses by its inherent elasticity against the wall 2' while the inner edges of its segments firmly bear upon the tube S to prevent its withdrawal from housing 1. Naturally, the axial depth of socket 13 must exceed the path length of the displaceable thrust member 4.

In order to release the tube S from the housing 1, it is merely necessary to push the tube S inwardly until — with the fluid flow again cut off — the spring 5, still bearing upon the peripheral housing wall 2, reverses itself and reassumes its original shape shown in FIG. 1. In this unstressed state, with the diameter of the central aperture of spring 5 somewhat larger than that of the tube S and therefore of socket 13 and opening 13, the ring segments of the spring are slightly separated from the tube surface so that the tube S can be readily extracted. Thus, boss 16 and disk 4 act as centering means allowing the illustrated tube extremity — with its end guided in socket 13 — to be freely inserted and withdrawn without contacting the unstressed spring S in the absence of fluid pressure.

Figure 3:
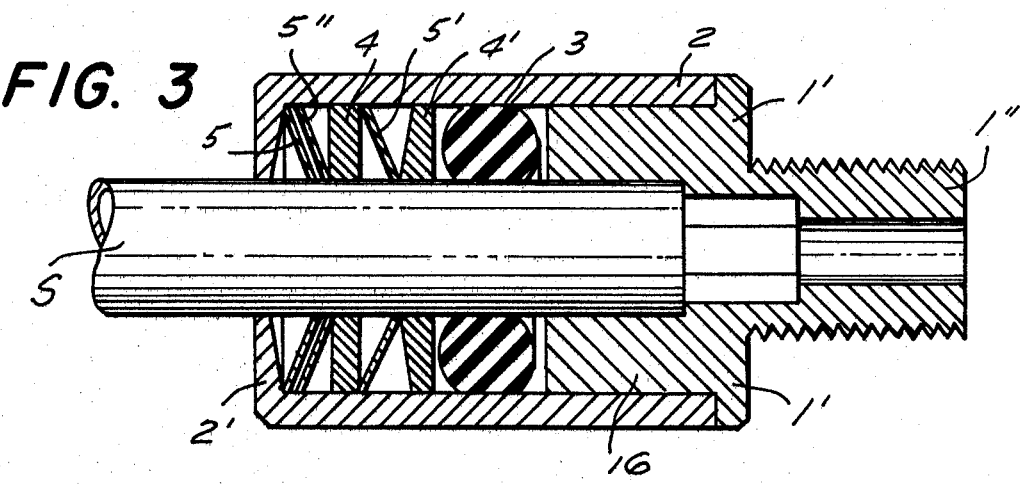
FIG. 3 is another view similar to FIG. 1, illustrating a modification.

The modified coupling of FIG. 3 includes the same elements as the one just described, with the addition of two further dished springs 5', 5" coaxially stacked with spring 5; spring 5" is directly juxtaposed with spring 5 and is separated from spring 5' by the thrust member 4; a similar thrust member 4' is interposed between O-ring 3 and spring 5', the latter thrust member having a frustoconical surface which is convex toward spring 5' and therefore, like the inner surface of end wall 2', concave toward the opposite end wall 1'. In operation, spring 5 again comes to rest on end wall 2' while remaining in full surface contact with the concurrently deforming spring 5"; spring 5' applies itself to the frustoconical surface of thrust member 4' so that all three springs eventually have the same inverted shape and grip the tube under stress.

Figure 4:
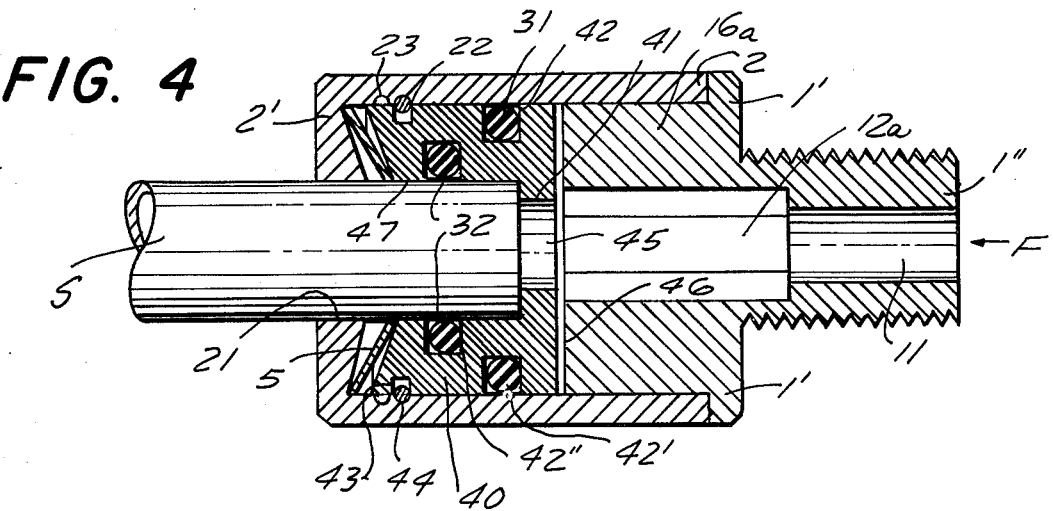
FIG. 4 is a further longitudinal sectional view, showing another embodiment.

In FIG. 4 the end wall 1' has a modified boss 16a with a throughgoing hexagonal bore 12a communicating with the cylindrical bore 11 of nipple 1" and with a similar bore 45 in a piston 40 representing the thrust member of this embodiment, the piston being initially separated from boss 16a by a narrow axial gap 46 which may be maintained by nonillustrated spacer pins, if necessary, and which enables pressure fluid F to shift the piston 40 to the left as soon as that fluid is admitted to bore 11. Piston 40 has outer and inner peripheral grooves 42' and 42" accommodating respective O-rings 31 and 32 which form a fluid seal toward shell 2 and the inserted tube S, respectively.

Piston 40 forms a socket 47 for the insertion of the tube extremity passing through wall opening 21. It further has a frustoconical front surface, concave toward end wall 2' which in this instance has a convex inner surface of the same conicity. Spring 5, interposed between these two surfaces, can thus be deformed only to a lesser extent than in the preceding embodiments, i.e. without inversion. It its tube-gripping state, therefore, the spring exerts a rightward pressure upon the piston 40 so as to tend to restore the illustrated insertion position, with release of tube S, if the fluid pressure is cut off. In order to prevent such an untimely decoupling, the shell 2 and the piston 40 are provided with indexing means in the form of a split ring 44 which is held in a peripheral groove 43 of the piston and snaps into either of two grooves 22, 23 on the inner shell surface for releasably holding the piston in its retracted or its advanced position. It will be apparent that such indexing means could also be provided in the devices of FIGS. 1 − 3, especially if the path of the disk 4 were limited to stop short of an inversion of the dished spring or springs.

The arrangement of FIG. 4, in which the angle included between the tube suface and the ring segments of spring 5 points toward the inlet of the housing, is particularly advantageous in the case of rubber hoses and similar flexible tubing. Again, uncoupling of the tube S merely requires that the fluid flow be turned off and that the tube S be pressed deeper into the housing whereby the piston 40 is reindexed in the retracted position shown in FIG. 4.

I claim:
1. A quick-acting coupling for connecting a source of pressure fluid to a tube, comprising:
 a housing having a shell centered on an axis of an associated nipple, a first end wall transverse to said axis with an inlet for axial admission of said pressure fluid and a second end wall transverse to said axis with an opening for the axial insertion of an extremity of said tube;
 at least one dished annular spring in peripheral contact with said shell, said spring having a pair of faces assuming in its unstressed state a frustoconical shape convex toward said inlet, said spring being disposed in said housing coaxially with said shell adjacent said second end wall and having a central aperture in line with said opening for penetration by the inserted tube extremity;
 centering means for said tube extremity in said housing including an annular thrust member axially slidable in said shell and coaxially juxtaposed with said spring between the latter and said first end wall, said centering means forming a socket of the same diameter as said opening and aligned therewith for receiving the end of the inserted tube extremity, said central aperture having a diameter slightly exceeding that of said socket and of said opening in said unstressed state whereby said tube extremity can be freely inserted and withdrawn without contacting said spring, said thrust member being axially shiftable by the pressure of fluid from said source for deforming said spring into gripping engagement with said tube extremity; and
 indexing means in said housing for releasably arresting said thrust member in an advanced position in which said spring is held deformed.

2. A coupling as defined in claim 1 wherein said spring is provided with a set of peripherally spaced radial slits extending outwardly from said central aperture, thereby dividing said spring into a plurality of coherent ring segments facilitating deformation thereof under said axial pressure.

3. A coupling as defined in claim 2 wherein each of said ring segments is subdivided into sections by at least one slit extending radially inwardly from the outer periphery thereof.

4. A coupling as defined in claim 1 wherein said thrust member and said second end wall have confronting surfaces bracketing said spring, at least one of said confronting surfaces being frustoconically shaped with a vertex angle larger than that of the frusto-conical faces of the unstressed spring for supporting said spring in its deformed state.

5. A coupling as defined in claim 1 wherein said thrust member is a piston provided with inner and outer sealing rings, said piston forming said socket and being separated from said first end wall by an axial gap for the development of fluid pressure acting upon said piston.

6. A quick-acting coupling for connecting a source of pressure fluid to a tube, comprising:
- a housing having a shell centered on an axis of an associated nipple, a first end wall transverse to said axis with an inlet for axial admission of said pressure fluid and a second end wall transverse to said axis with an opening for the axial insertion of an extremity of said tube;
- a dished annular spring in peripheral contact with said shell, said spring having a pair of faces assuming in its unstressed state a frustoconical shape convex toward said inlet, said spring being disposed in said housing coaxially with said shell adjacent said second end wall and having a central aperture in line with said opening for penetration by the inserted tube extremity; and
- centering means for said tube extremity in said housing including an annular thrust member axially slidably in said shell and coaxially juxtaposed with said spring between the latter and said first end wall, said centerig means forming a socket of the same diameter as said opening and aligned therewith for receiving the end of the inserted tube extremity, said central aperture having a diameter slightly exceeding that of said socket and of said opening in said unstressed state whereby said tube extremity can be freely inserted and withdrawn without contacting said spring, said thrust member being axially shiftable by the pressure of fluid from said source for deforming said spring into gripping engagement with said tube extremity, said second end wall having a frustoconical inner surface concave toward said inlet and provided with a vertex angle larger than that of the frustoconical faces of said spring for supporting said spring in its deformed state whereby said spring must pass through an unstable flat state before coming to rest against said inner surface.

7. A quick-acting coupling for connecting a source of pressure fluid to a tube, comprising:
- a housing having a shell centered on an axis of an associated nipple, a first end wall transverse to said axis with an inlet for axial admission of said pressure fluid and a second end wall transverse to said axis with an opening for the axial insertion of an extremity of said tube;
- at least one dished annular spring in peripheral contact with said shell, said spring having a pair of faces assuming in its unstressed state a frustoconical shape convex toward said inlet, said spring being disposed in said housing coaxially with said shell adjacent said second end wall and having a central aperture in line with said opening for penetration by the inserted tube extremity;
- a disk axially slidable in said shell and coaxially juxtaposed with said spring between the latter and said first end wall;
- a boss on said first end wall forming a socket of the same diameter as said opening and aligned therewith for receiving and centering the end of the inserted tube extremity, said central aperture having a diameter slightly exceeding that of said socket and of said opening in said unstressed state whereby said tube extremity can be freely inserted and withdrawn without contacting said spring; and
- an elastic ring in said housing positioned between said boss and said disk for frictionally engaging the inserted tube extremity to displace said disk toward said second end wall upon an axial shifting of said tube extremity in said socket in response to fluid pressure, thereby deforming said spring into gripping engagement with said tube extremity.

8. A coupling as defined in claim 7 wherein said ring is of toroidal shape and is in all-around peripheral contact with said housing.

9. A coupling as defined in claim 7 wherein said inlet further comprises an external nipple on said first end wall having a bore of a diameter less than that of said socket.

10. A coupling as defined in claim 8 wherein said boss is provided with an intermediate passage having a cross-sectional area less than that of said socket but greater than that of said bore.

11. A coupling as defined in claim 9 wherein said passage is hexagonal in cross-section.

12. A quick-acting coupling for connecting a source of pressure fluid to a tube, comprising:
- a housing having a shell centered on an axis of an associated nipple, a first end wall transverse to said axis with an inlet for axial admission of said pressure fluid and a second end wall transverse to said axis with an opening for the axial insertion of an extremity of said tube;
- at least one dished annular spring in peripheral contact with said shell, said spring having a pair of faces assuming in its unstressed state a frustoconical shape convex toward said inlet, said spring being disposed in said housing coaxially with said shell adjacent said second end wall and having a central aperture in line with said opening for penetration by the inserted tube extremity; and
- a piston axially slidable in said shell and coaxially juxtaposed with said spring between the latter and said first end wall, said piston forming a socket of the same diameter as said opening and aligned therewith for receiving and centering the end of the inserted tube extremity, said central aperture having a diameter slightly exceeding that of said socket and of said opening in said unstressed state whereby said tube extremity can be freely inserted and withdrawn without contacting said spring, said piston being axially shiftable by the pressure of fluid from said source for deforming said spring into gripping engagement with said tube extremity, said piston being provided with outer and inner sealing rings respectively contacting said shell and the inserted tube extremity.

* * * * *